United States Patent
Sutton et al.

(10) Patent No.: US 9,404,005 B2
(45) Date of Patent: Aug. 2, 2016

(54) RECYCLABLE THERMOPLASTIC INSULATION WITH IMPROVED BREAKDOWN STRENGTH

(75) Inventors: Simon Sutton, Egham (GB); Theo E. Geussens, Samstagern (CH); Alun Vaughan, Winchester (GB); Gary Stevens, Surrey (GB)

(73) Assignees: Dow Global Technologies LLC, Midland, MI (US); Dow Chemical Company Limited, Middlesex (GB); University of Southampton, Southampton (GB); GnoSys Global Ltd., Surrey (GB)

( * ) Notice: Subject to any disclaimer, the term of this patent is extended or adjusted under 35 U.S.C. 154(b) by 488 days.

(21) Appl. No.: 13/822,245

(22) PCT Filed: Sep. 23, 2011

(86) PCT No.: PCT/US2011/052921
§ 371 (c)(1),
(2), (4) Date: Mar. 11, 2013

(87) PCT Pub. No.: WO2012/044523
PCT Pub. Date: Apr. 5, 2012

(65) Prior Publication Data
US 2013/0175068 A1    Jul. 11, 2013

Related U.S. Application Data

(60) Provisional application No. 61/388,416, filed on Sep. 30, 2010.

(51) Int. Cl.
*C09D 123/06* (2006.01)
*C08L 23/06* (2006.01)
*H01B 3/30* (2006.01)

(52) U.S. Cl.
CPC .............. *C09D 123/06* (2013.01); *C08L 23/06* (2013.01); *H01B 3/307* (2013.01); *C08L 2205/02* (2013.01)

(58) Field of Classification Search
CPC ................. C08L 2205/025; C08L 2207/062; C08L 2207/066; C09D 123/06; H01B 3/307; C08J 2323/04
See application file for complete search history.

(56) References Cited

U.S. PATENT DOCUMENTS

| | | | |
|---|---|---|---|
| 4,007,308 A * | 2/1977 | Hemming | D04H 11/08 264/164 |
| 4,243,619 A * | 1/1981 | Fraser et al. | B29C 47/0004 264/210.1 |
| 4,346,834 A * | 8/1982 | Mazumdar | B65D 31/00 383/119 |
| 5,246,783 A | 9/1993 | Spenadel et al. | |
| 6,162,887 A | 12/2000 | Yamada et al. | |
| 6,433,120 B1 | 8/2002 | Rastogi et al. | |
| 6,496,629 B2 | 12/2002 | Ma et al. | |
| 6,610,401 B2 | 8/2003 | Castellani et al. | |
| 6,714,707 B2 | 3/2004 | Rossi et al. | |
| 6,824,870 B2 | 11/2004 | Castellani et al. | |
| 6,861,143 B2 | 3/2005 | Castellani et al. | |
| 6,908,673 B2 | 6/2005 | Castellani et al. | |
| 7,196,270 B2 | 3/2007 | Perego et al. | |
| 7,459,635 B2 | 12/2008 | Belli et al. | |
| 2008/0160861 A1 * | 7/2008 | Berrigan et al. | D04H 1/54 442/400 |
| 2009/0043049 A1 * | 2/2009 | Chapman et al. | C08L 23/02 525/240 |
| 2009/0246433 A1 | 10/2009 | Michie et al. | |

FOREIGN PATENT DOCUMENTS

| | | |
|---|---|---|
| EP | 1619217 A1 | 1/2006 |
| EP | 1159747 B1 | 9/2007 |
| EP | 1881507 A1 | 1/2008 |
| EP | 1881508 A1 | 1/2008 |
| EP | 1342249 B1 | 1/2009 |
| JP | 2006045295 A | 2/2006 |
| WO | 00/41187 A1 | 7/2000 |
| WO | 2007/019088 A1 | 2/2007 |
| WO | 2008/058572 A1 | 5/2008 |

OTHER PUBLICATIONS

Machine translation of JP2006045295.
C.P. Martin, et al., 2003 Annual Report Conference on Electrical Insulation and Dielectric Phenomena, pp. 309-312.
A.S. Vaughan, et al., European Polymer Journal, 39 (2003), pp. 355-365.
I.L. Hosier, et al., IEEE Transactions on Dielectrics and Electrical Insulation, vol. 9, No. 3, Jun. 2002, pp. 353-361.
S.J. Dodd, et al., IEE Proc.-Sci. Meas. Technol., vol. 150, No. 2, Mar. 2003, pp. 58-64.

(Continued)

*Primary Examiner* — Nathan M Nutter
(74) *Attorney, Agent, or Firm* — Whyte Hirschboeck Dudek S.C.

(57) ABSTRACT

The disclosure provides a process for producing a material with improved breakdown strength. The process includes heating a polymeric composition composed of a low density polyethylene (LDPE) and a minority amount of a high density polyethylene (HDPE). The polymeric composition is heated to at least the melting temperature of the HDPE. The process includes control-cooling the heated polymeric composition at a cooling rate from 0.1° C./min to 20° C./min, and forming a polymeric composition. The control-cooled polymeric composition has a unique morphology which improves breakdown strength. Also provided is a coated conductor with an insulating layer composed of the polymeric composition with the unique morphology. The insulating layer exhibits improved breakdown strength.

5 Claims, 3 Drawing Sheets

(56) References Cited

OTHER PUBLICATIONS

I.L. Hosier, et al., Journal of Polymer Science: Part B: Polymer Physics, vol. 38, 2309-2322 (2000).
I.L. Hosier, et al., Journal of Materials Science 32 (1997), 4523-4531.
I.L. Hosier, et al., J Mater Sci, An investigation of the potential of ethylene vinyl acetate/polyethylene blends for use in recycable high voltage cable insulation systems, published online: Feb. 12, 2010.

* cited by examiner

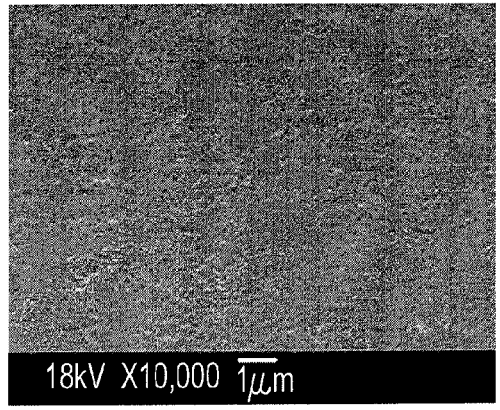
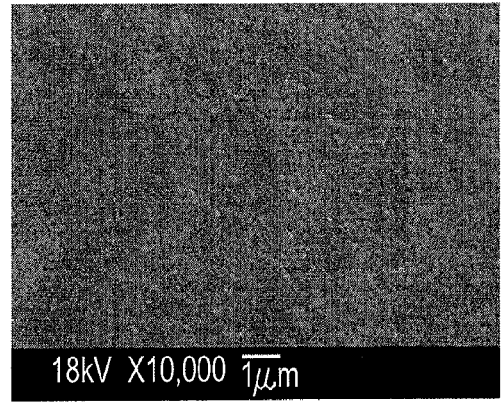
FIG. 2a        FIG. 2b
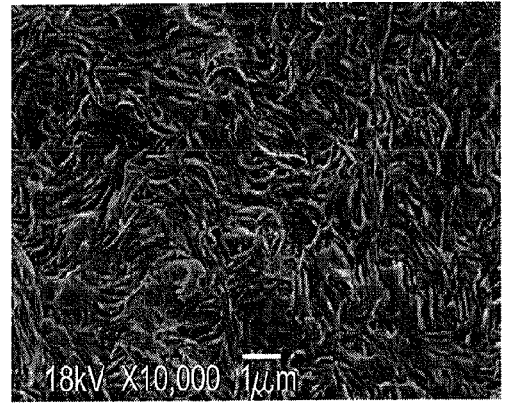
FIG. 3a        FIG. 3b

RECYCLABLE THERMOPLASTIC INSULATION WITH IMPROVED BREAKDOWN STRENGTH

CROSS REFERENCE TO RELATED APPLICATION

The present application is the national phase of PCT Patent Application No. PCT/US2011/052921 filed Sep. 23, 2011, which claims priority to U.S. provisional application Ser. No. 61/388,416 filed on Sep. 30, 2010, the entire content of which is incorporated by reference herein.

BACKGROUND

Public scrutiny of crosslinked insulating layer in wire and cable continues to heighten as social consciousness drives the development of ever-more sustainable materials. One favorable sustainability criteria is recyclability. It is well known that crosslinked materials are not readily recyclable and that, at the end of their life, crosslinked materials are generally disposed of by incineration or landfill.

In the search for sustainable substitutes for crosslinked insulating layer with high electrical breakdown strength, it is known that breakdown strength in a polymeric insulation layer is influenced by the polymer morphology. For example, isothermal crystallization of blends of branched polyolefin and linear polyolefin is known to improve the electrical breakdown strength and treeing resistance in polyolefin blends compared to the branched homopolymer for appropriate crystallization conditions.

Isothermal crystallization, however, has shortcomings. Isothermal crystallization requires the target polymer to be held at a constant crystallization temperature for an extended period—sometimes on the order of hours—in order to ensure complete crystallization. For this reason, isothermal crystallization is impractical for many commercial, industrial, and manufacturing applications. For example, an isothermal crystallization procedure for an insulating layer is wholly impractical in wire and cable production.

Accordingly, the art recognizes the need for a substitute to crosslinked insulating layer in wire and cable. Thus, a need exists for a crosslink-free insulating layer with improved dielectric strength and a process for producing same on a commercial scale. A need further exists for an insulating layer that is recyclable.

SUMMARY

The present disclosure is directed to processes for producing a thermoplastic insulation (or insulating layer for wire/cable) with a unique morphology for improved breakdown strength. The unique morphology is achieved by way of a controlled cooling protocol of a molten polyolefin blend. The processes of the present disclosure overcome the obstacles of applying isothermal crystallization to a manufacturing environment. Resultant product from these processes is also provided herein.

The present disclosure provides a process. In an embodiment, a process is provided and includes heating a polymeric composition composed of a low density polyethylene (LDPE) and a minority amount of a high density polyethylene (HDPE). The polymeric composition is heated to at least the melting temperature of the HDPE. The process includes control-cooling the heated polymeric composition at a cooling rate from 0.1° C./min to 20° C./min, and forming a polymeric composition. The formed polymeric composition has improved breakdown strength. In an embodiment, the polymeric composition has an AC breakdown strength greater 170 kV/mm as measured on 85 micrometer thin films in accordance with ASTM D 149.

The present disclosure provides another process. In an embodiment, a process is for producing a coated conductor is provided and includes heating a polymeric composition composed of a low density polyethylene (LDPE) and a minority amount of a high density polyethylene (HDPE) to above the melting temperature of the HDPE. The process includes extruding the heated polymeric composition onto a conductor, and control-cooling the heated polymeric composition located on the conductor at a cooling rate between 0.1° C./min and 20° C./min. The process further includes forming a coating on the conductor, the coating comprising the polymeric composition.

The present disclosure provides a coated conductor. In an embodiment, a coated conductor is provided and includes a conductor, and a coating on the conductor. The coating includes a polymeric composition. The polymeric composition includes a minority amount of high density polyethylene (HDPE) lamellae dispersed in a majority amount of low density polyethylene (LDPE). In an embodiment, the coating is an insulating layer. The unique HDPE lamellae morphology is the result of the control-cool process. The unique morphology of the insulating layer yields improved breakdown strength. In a further embodiment, the insulating layer is crosslink-free.

An advantage of the present disclosure is a thermoplastic composition with improved breakdown strength.

An advantage of the present disclosure is an insulating layer for wire and cable that is crosslink-free.

An advantage of the present disclosure is a crosslink-free insulating layer with improved breakdown strength for wire and cable applications.

An advantage of the present disclosure is an insulating layer for wire and cable that is recyclable.

BRIEF DESCRIPTION OF THE DRAWING

FIGS. 2a, 2b are scanning electron micrographs (SEM) of LDPE.

FIGS. 3a, 3b are SEMs of a polymeric composition in accordance with an embodiment of the present disclosure.

DETAILED DESCRIPTION

Figure 1:
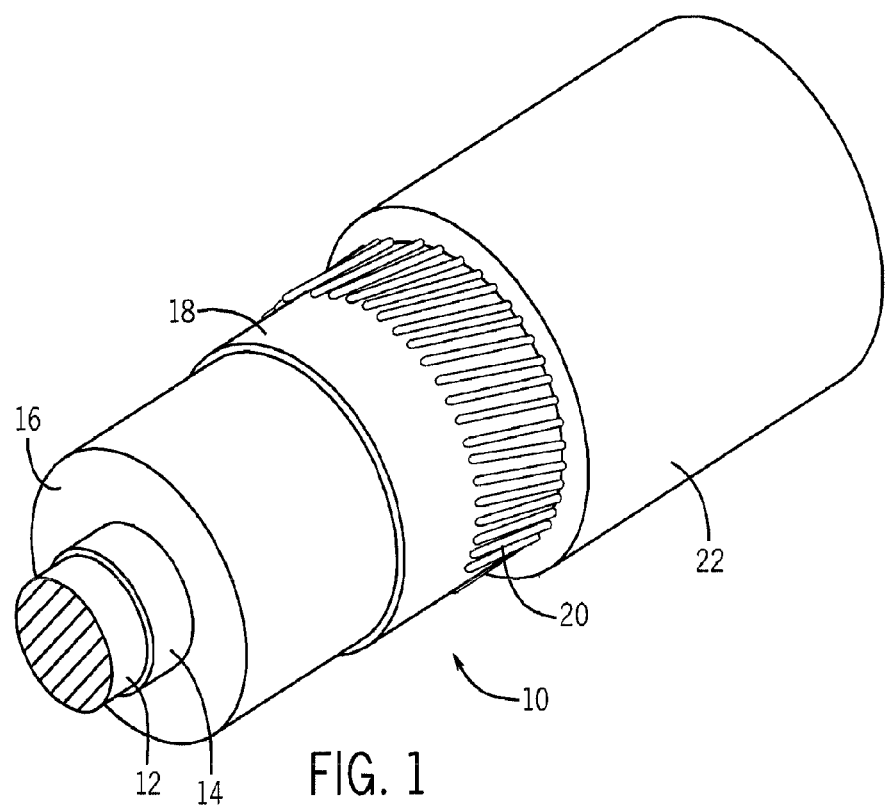
FIG. 1 is a perspective view of a power cable in accordance with an embodiment of the present disclosure.

The present disclosure provides a process. The process includes heating a polymeric composition composed of a low density polyethylene (LDPE) and a minority amount of a high density polyethylene (HDPE) to above the melting temperature of the HDPE. The process includes control-cooling the heated polymeric composition at a rate between 0.1° C./min and 20° C./min. The process further includes forming a polymeric composition. In an embodiment, the process includes forming a polymeric composition having an AC breakdown strength greater than 170 kV/mm as measured on 85 micrometer thick films in accordance with ASTM D 149.

Each of the LDPE and the HDPE is an ethylene-based polymer. The term, "ethylene-based polymer," as used herein, is a polymer that comprises a majority weight percent polymerized ethylene monomer (based on the total weight of polymerizable monomers), and optionally may comprise at least one polymerized comonomer. The ethylene-based polymer may include greater than 50, or greater than 60, or greater than 70, or greater than 80, or greater than 90 weight percent units derived from ethylene (based on the total weight of the ethylene-based polymer). The ethylene-based polymer may be a Ziegler-Natta catalyzed polymer, a metallocene-catalyzed polymer, a constrained geometry catalyst catalyzed polymer, a chain shuttling polymerized polymer (i.e., ethylene/α-olefin multi-block copolymer) and may be made using gas phase, solution, or slurry polymer manufacturing processes.

The ethylene-based polymer may be an ethylene homopolymer or an ethylene copolymer. The comonomer may be α-olefin such as a $C_{3-20}$ linear, branched or cyclic α-olefin. Nonlimiting examples of suitable $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this disclosure certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this disclosure. Illustrative ethylene polymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random copolymers.

The present polymeric composition contains a minority amount (less than 50 weight percent) of the HDPE and a majority amount (greater than or equal to 50 weight percent) of the LDPE. In an embodiment, the polymeric composition includes from about 5 wt %, or about 10 wt %, or about 15 wt %, to about 35 wt %, or about 30 wt %, or about 25 wt %, or about or about 20 wt % HDPE. The polymeric composition includes from about 65 wt %, or about 70 wt %, or about 75 wt % to about 95 wt %, or about 90 wt %, or about 85 wt %, or about 80 wt % of the LDPE. Weight percent is based on the total weight of the polymeric composition.

As used herein, the term "high density polyethylene (or "HDPE") is an ethylene-based polymer having a density greater than or equal to 0.941 g/cm³. HDPE has a low degree of branching compared to the LDPE.

In an embodiment, the HDPE has a density from about 0.945 g/cm³ to about 0.97 g/cm³, and/or a crystallinity of at least 70%, and/or a peak melting temperature of at least 130° C., or from about 132° C. to about 134° C. The HDPE has a melt index (MI) from about 0.1 g/10 min, or 0.2 g/10 min, or 0.3 g/10 min, or 0.4 g/10 min to about 5.0 g/10 min, or 4.0 g/10 min, or, 3.0 g/10 min or 2.0 g/10 min, or 1.0 g/10 min, or 0.5 g/10 min.

In an embodiment, the HDPE is an ethylene homopolymer.

The present polymeric composition contains a majority amount (greater than or equal to 50%) of the LDPE. As used herein, the term low density polyethylene (or "LDPE") is an ethylene-based polymer having a density range from 0.910 to 0.930 g/cm³. Relative to the HDPE, the LDPE has a high degree of short chain branching and/or a high degree of long chain branching. The LDPE can be produced by low pressure processes or high pressure processes. Low pressure processes are typically run at pressures below 1000 psi (pounds per square inch) whereas high pressure processes are typically run at pressures above 15,000 psi.

In an embodiment, the LDPE has a density from about 0.910 g/cm³ to about 0.930 g/cm³, and/or a crystallinity of at least 35%. The LDPE has a peak melting temperature of at least 105° C., or at least 110° C. to 115° C., or 125° C. The LDPE has an MI from about 0.5 g/10 min, or 1.0 g/10 min, or 1.5 g/10 min, or 2.0 g/10 min to about 10.0 g/10 min, or 8.0 g/10 min, or, 6.0 g/10 min or 5.0 g/10 min, or 3.0 g/10 min.

In an embodiment, the LDPE includes linear low density polyethylene.

The LDPE and the HDPE are mixed together to form the polymeric composition. In one embodiment, the LDPE and the HDPE are melt blended to form the polymeric composition. A dry blend of the LDPE and the HDPE is compounded (via melt extrusion for example) and formed into any desired shape (film, pellet, cable insulation, etc.). The polymeric composition may then be melt-shaped into an article as will be further discussed below. "Melt-shaped" and like terms refer to an article made from a thermoplastic composition that has acquired a configuration as a result of processing in a mold or through a die while in a melted state. Melt-shaped articles include wire and coatings, cable sheaths, compression and injection molded parts, sheets, tapes, ribbons and the like.

In another embodiment, the LDPE and the HDPE are fed into a cable insulation extruder and formed into an extrudate. The extrudate is applied to a conductor as described below. The extrudate forms an insulating layer on the conductor.

The polymeric composition is heated to above the melting temperature of the HDPE. In other words, the polymeric composition is heated to ensure that both the HDPE and the LDPE are in a molten state and can be extruded into its final shape.

The process includes control-cooling the heated polymeric composition. As used herein, the term "control-cooling," "control-cool," "control-cooled," and like terms is a procedure that applies an external cooling regime which results in lowering the temperature of the heated polymeric composition at a rate between 0.1° C./minute and 20° C./minute. Control-cooling of the heated polymer composition yields non-isothermal crystallization of at least the HDPE and optionally the LDPE. Thus a "control-cooled polymeric composition," is a composition that has been subjected to a control-cooling procedure. In an embodiment, the control-cool is a cooling rate from 0.1° C./min, or 0.2° C./min, or 0.5° C./min, to 20° C./min, 15° C./min, 10° C./min, or 8° C./min.

Control-cooling is distinct from cooling. The term "cooling" is a lowering in temperature in an uncontrolled manner. Control-cooling excludes isothermal crystallization. The term "isothermal crystallization" is crystallization of a polymer at a constant temperature, typically the crystallization temperature of the polymer. In other words, the temperature does not change during isothermal crystallization of the polymer. Control-cooling also excludes quenching. The term "quench," or "quenching," is rapid cooling of the material by but not limited to the (whole or partial) immersion of a heated material into a liquid bath (typically water).

In an embodiment, the control-cool includes exposing the heated polymeric composition to ambient air, exposing the heated polymeric composition to cooled or chilled fluid (such as but not limited to liquid, air, nitrogen, oxygen, or combinations thereof), passing the heated polymeric composition through a controlled-temperature chamber (such as a tube, pipe or conduit or bath), and any combination thereof.

In an embodiment, the process includes forming a polymeric composition having an AC breakdown strength greater than 170 kV/mm as measured on 85 micrometer thin films in accordance with ASTM D 149.

Applicant surprisingly discovered that morphology control can be achieved by way of the control-cooling. Bounded by no particular theory, it is believed that the control-cool crystallizes the HDPE to form a space-filling array of thick, individual HDPE lamellae, which are separated from one another by the LDPE. Crystallization subsequently proceeds through the LDPE phase. The term "HDPE lamellae," as used herein, are lamellae composed of a majority amount of HDPE molecules and a minority amount of LDPE molecules. "LDPE lamellae" are lamellae composed of a majority amount of LDPE molecules and a minority amount of HDPE molecules. Thus, it is understood that the HDPE and the LDPE do not perfectly separate from each other during crystallization. The control-cool unexpectedly produces a polymeric resin with improved breakdown strength. The control-cool surprisingly achieves the same target morphologies as obtained via isothermal crystallization of the polymeric composition. The control-cool advantageously avoids the obstacles isothermal crystallization poses to industrial applications and enables the production of a recyclable coated conductor with improved breakdown strength. FIG. 3 shows the unique morphology of HDPE lamellae present in the control-cooled polymeric composition.

In other words, the present process unexpectedly and unforeseeably bridges (i) the known benefits of isothermal crystallization with (ii) the practical demands of manufacturing. The control-cool yields the same, or substantially the same, space-filling morphology of HDPE lamellae, the same lamellar structure with no well-defined spherulite boundaries, as is produced by isothermal crystallization—yet without the extreme temperature demand and extreme time demands required by isothermal crystallization.

In an embodiment, the present process increases the AC breakdown strength on thin films. Compared to thin film composed of LDPE, (or composed solely of LDPE) a thin film (having the same size, the same thickness and the same LDPE as the LDPE film) composed of the present control-cooled polymeric composition has an AC breakdown strength at least 5%, or at least 8, %, or at least 9% greater than a thin film composed of the LDPE and not subjected to the control-cool. AC breakdown strength is measured on 85 micrometer thick films accordance with ASTM D149.

The rate of the control-cool can be constant or variable. The cooling range to which the control-cool is applied may be adjusted. For example, the polymeric composition may be heated to the melting point of the HDPE, 133° C., for example. The control-cool may be applied in the cooling range of 133° C. to 90° C. The control-cool may have a constant cooling rate of 0.5° C./minute in this cooling range.

In another nonlimiting example, the polymeric composition may be heated to 150° C., or above an HDPE melting point of 135° C. The polymeric composition is cooled from 150° C. to 125° C. The control-cool may then be initiated and may be applied to the cooling range of 125° C. to 90° C. The control-cool may be varied across this cooling range. The control-cool may have a cooling rate of 3° C./min until 120° C. is reached. Once at 120° C., the control-cool may be varied to 0.2° C./min until 105° C. is reached. At 105° C., the control-cool may be varied to 7° C./min until 90° C. is reached. In view of these nonlimiting examples, it is understood that the cooling rate during the control-cool may be constant or may be varied.

In an embodiment, the control-cool window is from 130° C., or 125° C. to 105° C., or 100° C., or 95° C., or 90° C. In this embodiment, the polymeric composition is heated to at least the melting temperature of the HDPE, typically greater than or equal to 130° C. When the temperature of the heated polymeric composition reaches the upper boundary (130° C., or 125° C.) for the control-cool window, the control-cool is initiated and is applied to the heated polymeric composition. The control-cool is applied until the heated polymeric composition reaches the lower boundary of the control-cool window (105° C., 100° C., 95° C., 90° C.). Once the temperature of the heated polymeric composition is below this lower boundary, the control-cool protocol is suspended and the heated polymeric composition is cooled and/or quenched.

In an embodiment, the process includes heating the polymeric composition to 130° C. and control-cooling the heated polymeric composition from 130° C. to 90° C., or control-cooling from 125° C. to 105° C.

In an embodiment, the process includes control-cooling heated polymeric composition at a rate of 0.1° C./minute to 10° C./minute when the temperature of the heated polymeric composition is from 130° C., or 125° C. to 105° C., or 100° C., or, 95° C., or 90° C.

In an embodiment, the process includes control-cooling at a rate of 20° C./minute.

In an embodiment, the process includes heating the polymeric composition to at least the melting temperature of the HDPE, typically at least 130° C. The heated polymeric composition is cooled (not control-cooled) until the temperature of the heated composition reaches 130° C. or 125° C. At 130° C. (or 125° C.), the heated polymeric composition is control-cooled. Control-cool is applied from 130° C., or 125° C. to 105° C., or 100° C., or 95° C., or 90° C. After the control-cool, the heated polymeric composition (now below 105-90° C.) is quenched.

In an embodiment, the process includes quenching or cooling the heated polymeric composition at any rate the heated polymeric composition when the temperature of the heated polymeric composition is less than 105° C., or less than 100° C., or less than 95° C., less than 90° C.

Coated Conductor

The improved breakdown strength of the present polymeric composition makes it well suited for wire and cable coating applications and wire/cable insulating layers in particular. Accordingly, the present disclosure provides a process to produce a coated conductor. A "conductor" is an element of elongated shape (wire, cable, fiber) for transferring energy at any voltage (DC, AC, or transient). The conductor is typically at least one metal wire or at least one metal cable (such as aluminum or copper) but may include optical fiber.

The conductor may be a single cable or a plurality of cables bound together (i.e., a cable core, or a core). A "cable" and like terms is at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers.

The process for producing a coated conductor includes heating a polymeric composition composed of a low density polyethylene (LDPE) and a minority amount of a high density polyethylene (HDPE) to at least the melting temperature of the HDPE, and extruding the heated polymeric composition onto the conductor. The term "onto" includes direct contact or indirect contact between the heated polymeric composition and the conductor. It is understood that the heated polymeric composition is in an extrudable state. The process further includes control-cooling the heated polymeric composition located on the conductor at a cooling rate between 0.1° C./min and 20° C./min, and forming a coating of the polymeric composition on the conductor.

In an embodiment, the control-cool includes exposing the conductor with molten coating thereon to a cooling medium such as but not limited to a fluid such as ambient air or a thermally-controlled liquid, exposing the conductor with molten coating thereon to a cooled or a chilled fluid (such as but not limited to air, nitrogen, oxygen, liquid or combinations thereof), passing the conductor with molten coating thereon through a controlled-temperature chamber (such as a tube, pipe, conduit or bath), leading the conductor with the molten coating thereon through a pipe with a controlled temperature, and any combination thereof.

In an embodiment, the process includes forming the polymeric composition into an insulating layer, the insulating layer having a DC breakdown voltage greater than 400 kV at ambient conditions as measured on the model cables described in the examples.

In an embodiment, the process includes forming a crosslink-free coating on the conductor.

The present disclosure is also directed to the coated conductor produced from the foregoing process. In an embodiment, a coated conductor is provided and includes a conductor, and a coating on the conductor. The coating includes a polymeric composition composed of a minority amount of high density polyethylene (HDPE) lamellae dispersed in a majority amount of low density polyethylene (LDPE).

Figure 6:
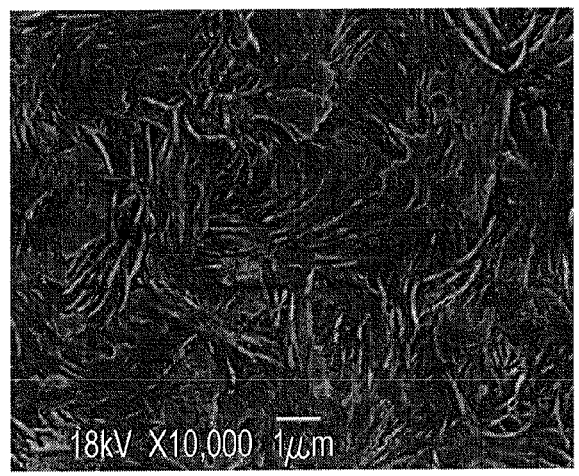
FIG. 6 is an SEM of a coated conductor insulating layer in accordance with an embodiment of the present disclosure.

The unique morphology of the polymeric composition in the coating is apparent in FIG. 6. FIG. 6 is an SEM micrograph of a coated conductor. By way of the control-cool, the HDPE crystallizes to form a space-filling array of thick, individual HDPE lamellae, which are separated by thin lamellae of the (LDPE). FIG. 6 shows a coating layer composed of 20 wt % HDPE and 80 wt % LDPE, the coating layer being a control-cooled coating layer (i.e., the coated conductor being subjected to a control-cool process as previously described herein). Visible in FIG. 6 is an array of thick HDPE lamellae separated by the LDPE.

In an embodiment, the coating contains a control-cooled polymeric composition. The control-cooled polymeric composition may be any control-cooled polymeric composition disclosed herein.

The coated conductor may be flexible, semi-rigid, or rigid. Nonlimiting examples of suitable coated conductors include flexible wiring such as flexible wiring for consumer electronics, a power cable, a power charger wire for cell phones and/or computers, computer data cords, power cords, appliance wiring material, and consumer electronic accessory cords.

The coating is located on the conductor. The coating may be one or more inner layers such as an insulating layer and/or a semiconducting layer. The coating may also include an outer layer (also referred to as a "jacket" or a "sheath"). The coating includes any of the present polymer compositions as disclosed herein. As used herein, "on" includes direct contact or indirect contact between the coating and the conductor. "Direct contact" is a configuration whereby the coating immediately contacts the conductor, with no intervening layer(s) and/or no intervening material(s) located between the coating and the conductor. "Indirect contact" is a configuration whereby an intervening layer(s) and/or an intervening structure(s) or material(s) is/are located between the conductor and the coating. The coating may wholly or partially cover or otherwise surround or encase the conductor. The coating may be the sole component surrounding the conductor. Alternatively, the coating may be one layer of a multilayer jacket or sheath encasing the metal conductor.

In an embodiment, the coating of the coated conductor is an insulating layer. The insulating layer has a DC breakdown voltage greater 400 kV at ambient conditions as measured on the model cables described below.

In an embodiment, the polymeric composition present in the coating includes from about 5 wt %, or 10 wt %, or 15 wt %, to about 35 wt %, or about 30 wt % to 25 wt %, or about 20 wt % HDPE and from about 95 wt %, or about 90 wt %, or about 85 wt %, or about 80 wt %, to about 75 wt %, or about 70 wt %, or about 65 wt %, of the LDPE.

In an embodiment, the HDPE present in the coating includes at least 70% crystalline content and a peak melting temperature of at least 130° C.

In an embodiment, the LDPE present in the coating has a crystallinity of 35% and a peak melting temperature from about 105° C. to about 120° C.

In an embodiment, the coating is a crosslink-free coating.

In an embodiment, the polymeric composition present in the coating includes a space-filling morphology of HDPE lamellae having a thickness greater than 10 nm and LDPE lamellae too thin to be observed as determined by scanning electron microscopy following permanganic etching.

Nonlimiting examples of suitable coated metal conductors include flexible wiring such as flexible wiring for consumer electronics, a power cable, a power charger wire for cell phones and/or computers, computer data cords, power cords, appliance wiring material, building wire, automotive wire, and consumer electronic accessory cords.

In an embodiment, the coated conductor is a power cable operating at a voltage greater than 1 kV, or greater than 6 kV, or greater than 36 kV. FIG. 1 shows an insulated power cable 10 which includes a metallic conductor 12, an internal semiconducting layer 14, an insulating layer 16, an external semiconducting layer 18, and a metallic screen 20 of wound wires or conducting bands, and an outermost layer, with a sheath 22.

In an embodiment, the insulating layer 16 is composed of the present polymeric composition containing the HDPE/LDPE blend and exhibiting defined morphology and concomitant improved breakdown strength. In other words, layer 16 is a control-cooled insulating layer and includes the unique HDPE lamellae morphology, as described herein. The polymeric composition of the insulating layer 16 is composed of a minority HDPE component forming a space-filling array of thick, individual lamellae, which are separated from one another by the minority LDPE component.

Additives

Any of the foregoing polymeric compositions and/or coatings may optionally contain one or more additives. Nonlimiting examples of suitable additives include antioxidants, stabilizers, lubricants, and/or processing aids. As antioxidant, sterically hindered or semi-hindered phenols, aromatic amines, aliphatic sterically hindered amines, organic phosphates, thio compounds, and mixtures thereof, are included. As further nonlimiting additives, flame retardant additives, acid scavengers, inorganic fillers, water-tree retardants and other voltage stabilizers are included.

The processes, and/or the polymeric composition, and/or the coated conductor may comprise two or more embodiments disclosed herein.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 97 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The "breakdown strength" of an insulator is the minimum electrical stress that causes a portion of an insulator to become electrically conductive. AC breakdown strength for polymeric composition is determined in accordance with ASTM D 149. DC breakdown voltage for insulating layer of coated conductor is determined at ambient conditions as mini-cables (Example 2) as disclosed herein.

"Cable" and like terms is at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used herein, "crystalline" is defined as having an identifiable melting peak as determined by Differential Scanning calorimetry (DSC peak melting temperatures).

An "insulating layer" is a layer made of a material having insulating properties, namely a volume resistivity of greater than $10^8$ ohm-cm, or greater than $10^{10}$ ohm-cm.

A "layer," as used herein, is polymer based layer surrounding the conductor, for example, an electrically insulating layer, a semiconductive layer, a sheath, a protective layer, a water blocking layer, or a layer performing combined functions, for example, a protective layer charged with a conductive filler.

The melting point ("Tm") is determined as the peak melting temperature by differential scanning calorimetry ("DSC").

The term "polymer" is a macromolecular compound prepared by polymerizing monomers of the same or different type. "Polymer" includes homopolymers, copolymers, terpolymers, interpolymers, and so on. The term "interpolymer" is a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

A "semiconductive layer" is a layer made of a material having semiconductive properties, namely a volumetric resistivity value of less than 1000 Ω-m or less than 500 Ω-cm, when measured at 90° C.

Test Methods

AC breakdown strength is measured in accordance with the principles of ASTM D 149 by placing thin films (85 micrometers in thickness) between two vertically opposed 6.3 mm ball bearings in a tank of 20 cs silicone fluid and applying a 50 Hz voltage ramp from zero until breakdown at a rate of 50±2 $Vs^{-1}$."

Melt index (MI) is measured in accordance with ISO 1133 or ASTM D 1238-01 test method at 190° C. with a 2.16 kg weight for ethylene-based polymers.

Density is measured in accordance with ISO 1183 or ASTM D 792.

Melting points and crystallinities are measured on a DSC equipment, following ISO 11357-3, using a heating rate of 10° C./min.

Scanning electron microscopy is performed with a JEOL JSM 5910 scanning electron microscope.

By way of example, and not by limitation, examples of the present disclosure are provided. Unless otherwise noted, all parts and percentages are by weight.

EXAMPLES

1. Thin Films

Components for the thin film of Example 1 are provided in Table 1 below.

TABLE 1

|  | HDPE (40055E) | LDPE (DFDK-7423 NT) |
|---|---|---|
| MI | 0.41 | 2.1 |
| density | 0.955 | 0.920 |
| wt %* | 20 | 80 |

*Based on total wt of composition

Both the pure LDPE and the 80:20 LDPE/HDPE blend are processed on a Haake twin screw lab extruder PTW 16/40D equipped with a 3 mm capillary die. The temperature profile is: 170/180/180/180/180/180/180/180° C. and the screw speed is 280 RPM. The polymer strand is cooled in a water bath and cut into granules.

Thin film specimens (~85 µm in thickness) of both the blended polymer (Example 1) and the neat LDPE, are prepared using a Graseby-Specac 25.011 hydraulic press. The mould is heated to a stable temperature of 200° C. Approximately 0.13 g of polymer is inserted into the mould between aluminum foils and inserted into the press; after 10 seconds, a pressure of 4 tons is applied. The sample is removed and quenched in a beaker of tap water.

Thermal histories are imparted to the samples using a Mettler Toledo FP82HT hotstage. The hotstage is pre-heated to 200° C. and the samples (still in their foils) are held at this temperature for 2 min. The samples are either (1) quenched immediately or (2) removed from the hotstage and (a) cooled from 200° C. to 130° C. at a rate of 20° C./min. Once at 130° C., control-cool commences. From 130° C. to 90° C. the control-cool is performed at (A) 0.5° C./min or (B) 10° C./min.

The foils are removed by shaking the samples in ~4 wt % HCl in distilled water for 6 hours. The samples are then washed thoroughly in distilled water and left to dry overnight.

The breakdown strength values for these samples are determined in accordance with the procedures of ASTM D 149 by placing the disks between two vertically opposed 6.3 mm ball bearings in a tank of 20 cs silicone fluid. A 50 Hz ramp is applied from zero until breakdown at a rate of $50\pm2$ Vs$^{-1}$. For each thermal history, 3 disks are each subjected to 8 breakdown events.

The resulting data are processed using the Weibull ++7 software from Reliasoft Corp. This provides maximum likelihood estimates of the Weibull scale and shape parameters together with 90% 2-tailed confidence intervals. Table 2 lists the derived data.

TABLE 2

Maximum likelihood Weibull parameters with 90% uncertainties

|  | Scale parameter (kV/mm) | Shape parameter |
|---|---|---|
| LDPE - quenched | 161 ± 2 | 27 ± 6 |
| Blend formulation - quenched | 165 ± 4 | 14 ± 4 |
| Blend formulation - 0.5K min$^{-1}$ | 176 ± 4 | 19 ± 5 |
| Blend formulation - 10K min$^{-1}$ | 178 ± 3 | 20 ± 5 |

The above combined hydraulic press—hotstage procedure is also used to generate approximately 400 µm thick films which are then cut, microtomed and permanganically etched. Samples are mounted on SEM stubs and coated with gold prior to examination by scanning electron microscopy (SEM) operating in secondary electron imaging mode.

The morphology of the quenched blended polymer and the quenched LDPE are shown in FIGS. 2a, 2b. The micrographs of FIGS. 2a, 2b reveal comparable morphological features that are characterized by fine-scale lamellar detail.

Example 1 is shown in FIGS. 3a, 3b. FIGS. 3a, 3b show the unique HDPE lamellae that are formed as a result of the control-cool. Example 1 is crystallized under control-cool conditions to facilitate the development of the coarse space filling lamellar texture, exhibiting enhanced breakdown strength compared with both (i) the quenched blend and (ii) the reference LDPE.

The morphology of the blended polymer specimens of Example 1 crystallized at cooling rates of 0.5° C./min and 10° C./min (i.e., the control-cool), are shown below in FIGS. 3a, 3b respectively.

The micrographs of FIG. 3a, 3b reveal comparable morphological features that are characterized by a coarse space filling lamellar texture. The LDPE component is unable to crystallize above ~110° C., whereas the HDPE component crystallizes readily at temperatures in excess of 110° C. Consequently, on controlled cooling from the melt, only the HDPE component crystallizes at temperatures above 110° C., to give singular crystals that are separated by pockets of molten LDPE. The LDPE is unable to crystallize at such high temperatures. The LDPE only solidifies on further cooling to give an extremely fine scale lamellar texture which form within the pre-established framework of HDPE crystals. The crystallization of the HDPE occurs via the standard nucleation/dominant/subsidiary spherulitic mode. When the nucleation density is high (as here), mature spherulitic forms are replaced by less apparent immature sheaf-like structures. Differentiation of dominant and subsidiary lamellae is then unclear, such that the morphology is best thought of in terms of an array of individual HDPE lamellae, greater than 10 nm in thickness, the lamellae extending for many microns in orthogonal directions. The lamellae are separated by pockets of LDPE that appear largely featureless.

2. Mini-Cables

Components for the insulating layer of mini-cables of Example 2 are provided in Table 3 below.

TABLE 3

|  | HDPE (40055E) | LDPE (DFDK-7423 NT) |
|---|---|---|
| MI | 0.41 | 2.1 |
| density | 0.955 | 0.920 |
| wt % | 20 | 80 |

*Based on total wt of composition

An antioxidant masterbatch of 4% Irganox 1010 in 96% LDPE is prepared on a small ZSK 25.2 twin screw extruder. 2.5% of the antioxidant masterbatch is mixed together with the LDPE and the HDPE in a Berstorff ZE40UT. A screen with an opening of 100 micrometer is used to achieve a proper cleanliness level so that electrical breakdown is predominantly achieved by the morphology of the insulation and not by the presence of large contaminants. The throughput is 100 kg/h.

The temperature settings for the extruder are:
Zones 2-8: 160/190/200/210/210/210/210° C.
Screenpack: 210° C.
3-way valve: 220° C.
Die plate: 230° C.

As a reference, a compound is made of 97.5% LDPE and 2.5% of the antioxidant masterbatch. The same extruder settings are used. The output rate is 120 kg/h.

Three cables are manufactured on a Troester triple extrusion line. This triple extrusion line includes a 45 mm 20 L/D insulation extruder and two 30 mm L/D20 extruders for the inner and outer semicon screens.

A 10 kV model cable is manufactured with the following characteristics.

Conductor: aluminum, 25 mm$^2$
Inner semicon (conductor screen): carbon black polymer (HFDK-0587 BK) or the thermoplastic version (without peroxide).
Insulation: the present polymeric composition compound, thermoplastic LDPE or crosslinked PE (XLPE, HFDK-4201 EC) (comparative examples); nominal thickness: 4 mm.
No outer semicon (insulation screen)

The following temperature profiles are set to process the cable with the present polymeric composition and the thermoplastic LDPE:

Inner semicon extruder: 150/150/150/150/150° C.
Insulation extruder: 140/140/140/140/140° C.
The temperatures of the three zones in the head are set at: 150/150/150° C.

A filter with 160 micrometer opening is installed in the insulation extruder. The cable runs through an open CV tube without heating; the cooling section is operated under normal conditions. The temperature of the melt leaving the die is measured with an infrared measurement tool, giving surface temperatures of 149° C. and 148° C. respectively for the present polymeric composition and thermoplastic LDPE. At the exit of the CV tube, the melt has a surface temperature of 60-64° C.

The reference cable with the XLPE insulation and semiconductive material (carbon black polymer, HFDK-0587 BK), inner semicon is extruded using the following conditions:

Insulation extruder temperature: 125/125/123/123/123° C.
Inner semicon extruder: 125/125/123/123/123° C.
Head temperatures: 125/125/125° C.
CV tube temperatures were set at: 360/360/360/270° C.

Table 4 lists the cable manufacture conditions for the three cable designs detailed above.

TABLE 4

Cable manufacturing conditions

| Property | Example 2 | Thermoplastic LDPE (CS1) | HFDK-4201EC/ HFDK-0587 BK (CS2) |
|---|---|---|---|
| Insulation extruder | | | |
| Screw speed (rpm) | 25 | 25 | 35 |
| Melt temp (° C.) | 164 | 163 | 133 |
| Semicon extruder | | | |
| Screw speed (rpm) | 7 | 7 | 10 |
| Melt temp (° C.) | 151 | 152 | 138 |
| Line speed (m/min) | 1.1 | 1.1 | 1.5 |
| Core outside diameter (mm) | 15.1 | 15.1 | 14.8 |

DC Breakdown Testing for Insulation Layer of Coated Conductor

Ambient Conditions.

DC testing of the mini-cables is performed using a Henry Patterson & sons Ltd 600 kV test set. Each test is performed on a 6 m cable loop, cut from the cable drum, crimped and hung from a 3 m fiber glass rod attached to a winch. The insulation layer is 4 mm thick. The conductor is connected to the HVDC supply using a 2 m copper pipe.

For ambient (room temperature) (15±5° C.) breakdown testing, a trough of tap water is used as the ground electrode; the length of the cable under water was 1.3 m±10%.

The voltage is applied stepwise in 14 kV steps, held for 30 seconds and then raised to the next voltage level at a rate of 1.75 kV/s. This is repeated until the cable breaks down. Breakdown results are shown in Table 5. The technical constraints necessitate the censoring of any data that fails to breakdown below an applied voltage of 400 kV. These data are indicated as ">400". Where possible, the resulting data are processed using the Weibull ++7 software from Reliasoft Corp. This provides maximum likelihood estimates of the Weibull scale and shape parameters.

Elevated Temperatures.

For measurements at elevated temperatures, the test cable is passed through a thermally insulated tube of water (acting as the earth electrode); the length of the cable under water was 1.3 m±2.5%.

Breakdown measurements at elevated temperatures are performed at 67±10° C. and 100±15° C. The cable loop is inductively heated using a current transformer and the temperature of the conductor estimated from a calibration test loop and the water temperature recorded at the start and end of the breakdown test.

TABLE 5

Breakdown data for individual mini-cables and Weibull parameters

| Material | Temperature (° C.) | Cable sample breakdown voltage (kV) | | | | | Weibull characteristic breakdown voltage (kV) | Weibull shape parameter |
|---|---|---|---|---|---|---|---|---|
| | | 1 | 2 | 3 | 4 | 5 | | |
| XLPE | 15 ± 5 | 164 | 177 | 190 | 190 | 217 | 196 | 11 |
| | 67 ± 10 | 96 | 123 | 137 | 137 | 150 | 136 | 9 |
| | 100 ± 15 | 123 | 123 | 150 | — | — | N/A | N/A |
| LDPE | 15 ± 5 | >400 | >400 | >400 | 392 | 338 | N/A | N/A |
| | 67 ± 10 | >400 | >400 | 285 | 365 | 365 | N/A | N/A |
| | 100 ± 15 | 190 | 244 | 365 | — | — | N/A | N/A |

TABLE 5-continued

Breakdown data for individual mini-cables and Weibull parameters

| Material | Temperature (° C.) | Cable sample breakdown voltage (kV) | | | | | Weibull characteristic breakdown voltage (kV) | Weibull shape parameter |
|---|---|---|---|---|---|---|---|---|
| | | 1 | 2 | 3 | 4 | 5 | | |
| Example 2 | 15 ± 5 | >400 | >400 | >400 | >400 | >400 | N/A | N/A |
| | 67 ± 10 | >400 | >400 | >400 | 379 | 352 | N/A | N/A |
| | 100 ± 15 | >400 | 325 | 271 | — | — | N/A | N/A |

*Present polymeric composition

Samples are cut from the mini-cables made with all three insulation types, microtomed and permanganically etched. Samples were mounted on SEM stubs and coated with gold prior to examination by scanning electron microscopy (SEM) operating in secondary electron imaging mode.

Figure 4:
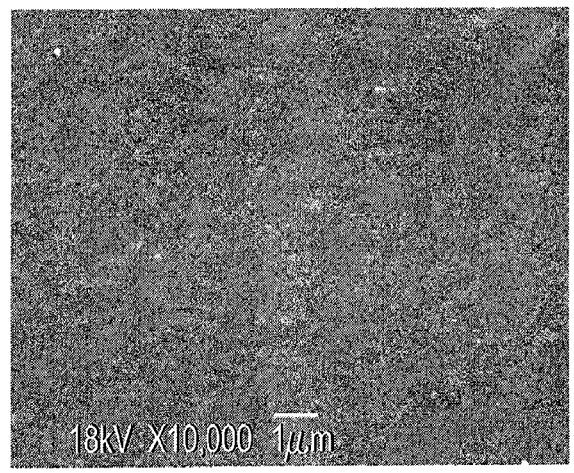
FIG. 4 is an SEM of crosslinked polyethylene.

For the conventional peroxide cured XLPE insulation from the mini-cable (CS2), molecular crosslinking occurs in the melt giving a material with a gel content in excess of 80%. Consequently molecular mobility is severely restricted and the crystals that form are limited in both their thickness and lateral extent. The morphology (FIG. 4) is defined by an apparently random array of small lamellar crystals less than 10 nm in thickness, which extend for ~100 nm in orthogonal directions. No evidence of large scale super-crystalline ordering exists.

Figure 5:
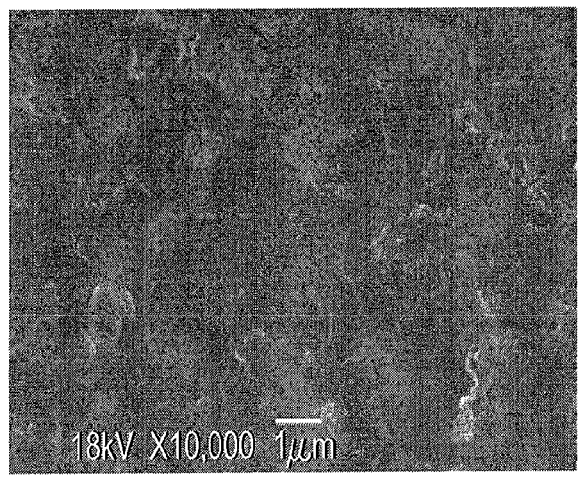
FIG. 5 is an SEM of a coated conductor insulating layer composed of LDPE.

The morphology of the LDPE insulation from the mini-cable (CS1) (FIG. 5) is typified by a spherulitic crystallization mode where the lamellae that make up the spherulites are largely equivalent. The extent to which spherulites are immediately visible depends upon the nucleation density. Where the nucleation density is high (as here), the available space is sufficiently limited that mature spherulitic forms are replaced by less apparent immature sheaf-like structures. Nevertheless, the morphology is defined by the underlying principles of nucleation, the initial formation of an array of dominant lamellae and the subsequent development of infilling subsidiary crystallization. Here the dominant and subsidiary lamellae are effectively equivalent: both are of the order of less than 10 nm in thickness and extend for ~1 μm in orthogonal directions.

FIG. 6

A nonlimiting example of the coated conductor is shown in FIG. 6. FIG. 6 is an SEM micrograph of a coated conductor, Example 2. FIG. 6 shows the insulation layer of the coated conductor, the insulation layer composed of a polymeric composition composed of 20 wt % HDPE and 80 wt % LDPE. FIG. 6 shows the HDPE forms a space-filling array of thick, individual lamellae, which are separated from one another by the dispersed LDPE.

The morphology of the blend system of the present polymeric composition Example 2 (FIG. 6) is defined by the bimodal nature of the molecular distribution. The LDPE component is unable to crystallize above ~110° C., whereas the HDPE component crystallizes readily at temperatures in excess of 110° C. Consequently, applying the control-cool permits only the HDPE component to crystallize at temperatures above 110° C., to give singular crystals that are separated by pockets of molten LDPE. The LDPE is unable to crystallize at such high temperatures. The LDPE only solidifies on further cooling to give an extremely fine scale lamellar texture which form within the pre-established framework of HDPE crystals. The crystallization of the HDPE occurs via the standard nucleation/dominant/subsidiary spherulitic mode. When the nucleation density is high (as here), mature spherulitic forms are replaced by less apparent immature sheaf-like structures. Differentiation of dominant and subsidiary lamellae is then unclear, such that the morphology is best thought of in terms of an array of individual HDPE lamellae, greater than 10 nm in thickness, that extend for many microns in orthogonal directions. These are separated by pockets of LDPE that appear largely featureless.

Although the disclosure has been described with certain detail through the preceding specific embodiments, this detail is for the primary purpose of illustration. Many variations and modifications can be made by one skilled in the art without departing from the spirit and scope of the disclosure as described in the following claims.

What is claimed is:

1. A process comprising:
   heating a polymeric composition consisting of (i) a low density polyethylene having a melting temperature of at least 105° C. to 125° C. (LDPE) (ii) a minority amount of a high density polyethylene having a melting temperature of at least 130° C. to 134° C. (HDPE), and (iii) optional antioxidant, to at least the melting temperature of the HDPE;
   control-cooling the heated polymeric composition at a cooling rate from 0.1° C./min to 10° C./min; and
   forming a polymeric composition having a space-filling array of HDPE lamellae, which are separated by the LDPE, the polymeric composition having an AC breakdown strength greater than 170 kV/mm as measured on 85 micrometer thin films in accordance with ASTM D 149.

2. The process of claim 1 comprising:
   melt blending from about 5 wt % to about 35 wt % HDPE and from about 95 wt % to about 65 wt % of the LDPE, and
   forming the polymeric composition.

3. The process of claim 1 comprising heating the polymeric composition to at least 130° C.; and control-cooling from 130° C. to 90° C.

4. The process of claim 1 comprising heating the polymeric composition to at least 130° C.; and
   control-cooling the heated polymeric composition at a rate from 0.1° C./min to 10° C./min from 130° C. to 90° C.

5. The process of claim 1 comprising heating the polymeric composition to at least 130° C.;
   control-cooling from 130° C. to 90° C.; and
   quenching when the temperature of the heated polymeric composition is less than 105° C.

* * * * *